(No Model.) 2 Sheets—Sheet 1.
A. COATES.
COMBINED REEL HANDLE AND FISHING REEL.
No. 379,683. Patented Mar. 20, 1888.
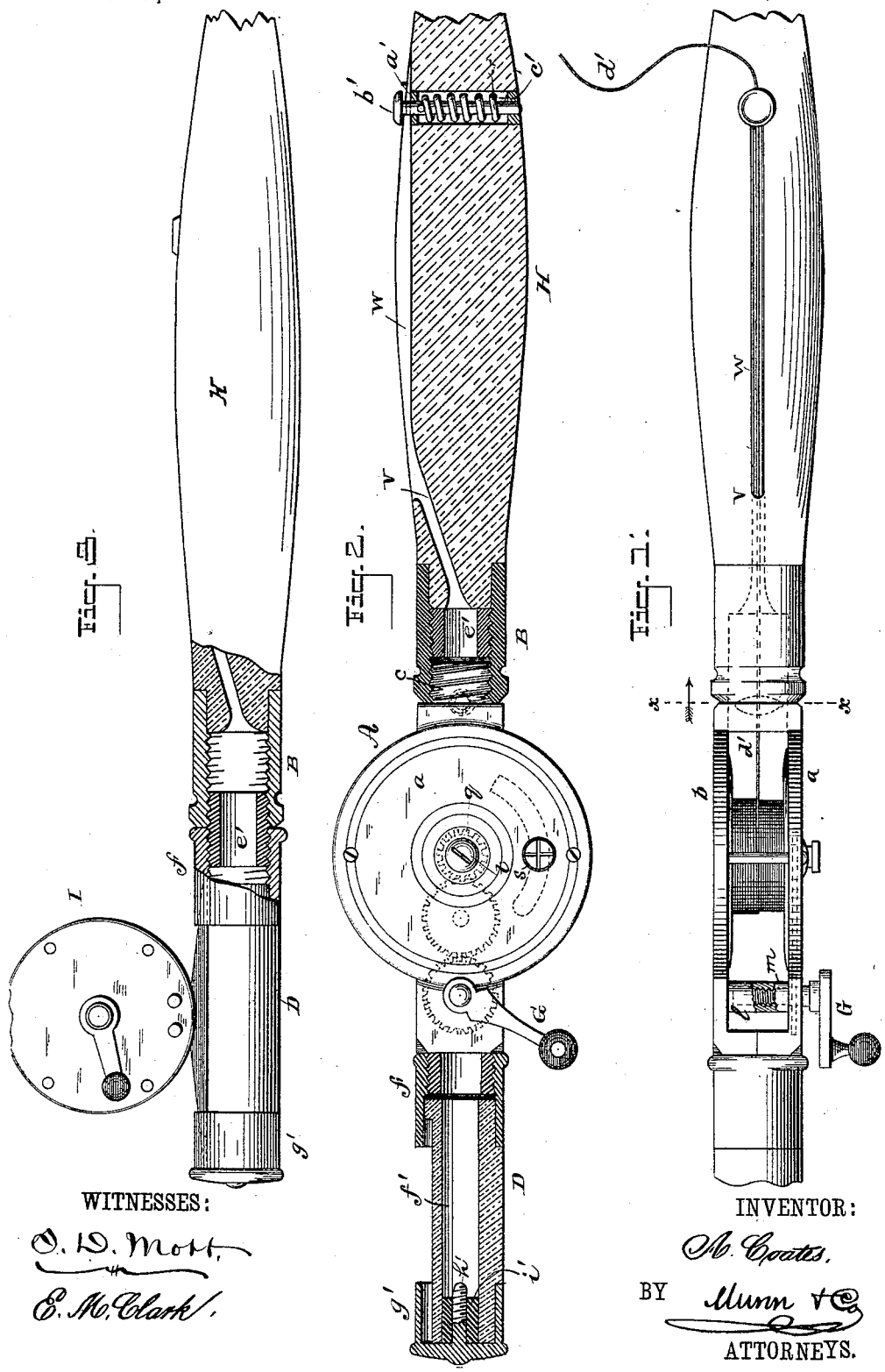
WITNESSES:
O. D. Mott
E. M. Clark
INVENTOR:
A. Coates,
BY Munn & Co
ATTORNEYS.

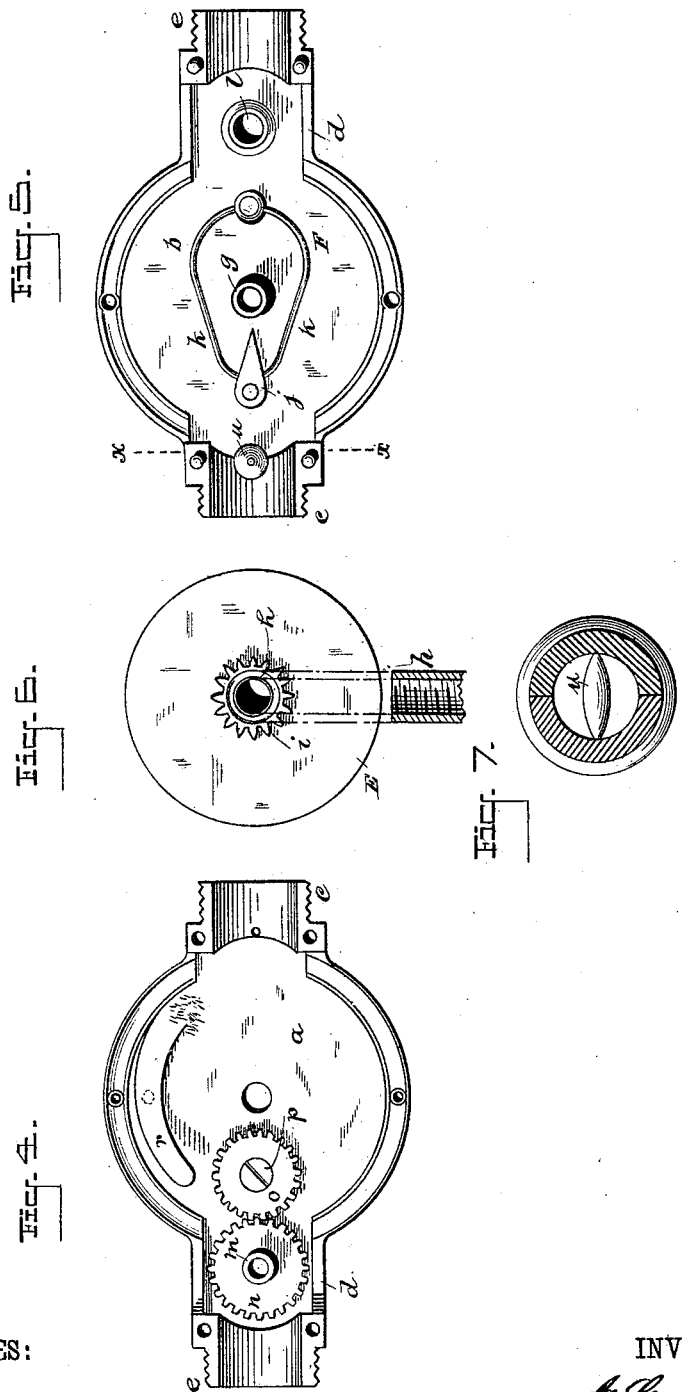

UNITED STATES PATENT OFFICE.

ABRAHAM COATES, OF WATERTOWN, NEW YORK.

COMBINED REEL-HANDLE AND FISHING-REEL.

SPECIFICATION forming part of Letters Patent No. 379,683, dated March 20, 1888.

Application filed June 23, 1887. Serial No. 242,283. (No model.)

*To all whom it may concern:*

Be it known that I, ABRAHAM COATES, of Watertown, in the county of Jefferson and State of New York, have invented a new and Improved Combined Reel-Handle and Fishing-Reel, of which the following is a specification, reference being had to the annexed drawings, forming a part thereof, in which—

Figure 1 is a plan view of my improved fishing-reel. Fig. 2 is a side elevation, partly in section, of the same. Fig. 3 shows the application of an ordinary reel to my improved reel-handle. Figs. 4 and 5 are side elevations of the sides of the reel-casing, showing their inner faces. Fig. 6 is a rear elevation of the reel, and Fig. 7 is a transverse section taken on line $x\ x$ in Fig. 1.

Similar letters of reference indicate corresponding parts in all the figures.

The object of my invention is to provide a fishing-reel and a handle adapted thereto which shall combine all the desirable features of the fishing-reel in a compact and convenient form.

My invention consists in the combination, with the reel-frame adapted to screw into sockets upon the ends of the parts of the reel-handle, of a reel and multiplying-gearing adapted to turn said reel, and a crank which may be transferred from the multiplying-gearing to the reel itself, so as to secure both slow and fast winding.

It also further consists in a novel brake for retarding the rotation of the reel and in a double-acting click for indicating the movement of the reel.

It also further consists in the combination, with the reel-frame, of a transverse spindle made convex in the middle of its length to insure the regular winding of the line.

It also further consists in the combination, with the reel and its frame, of an apertured handle provided with a longitudinal groove for receiving the line from the reel, and in the combination, with the groove and apertured handle, of a friction device for controlling the paying out of the line.

It also further consists in an externally-threaded thimble inserted in the socket of the apertured and slotted portion of the reel-handle, and adapted to project beyond the end of the said socket for engagement with the extremity of the reel-handle, all as hereinafter more fully described.

The frame A of the reel is formed of two side plates, $a\ b$, each having upon one edge a hollow semi-cylindrical projection, $c$, threaded externally to receive the socket B of the reel-handle C. Flat ears $d$ extend from diametrically-opposite edges of the plates $a\ b$, and are provided at their outer extremities with hollow semi-cylindrical externally-threaded extensions $e$, for receiving the internally-threaded ferrule $f$ of the end piece, D, of the handle.

In the center of the plate $b$ is fixed a tubular stud, $g$, to which is fitted the tubular shaft $h$ of the reel A. To the surface of the reel A, adjoining the plate $b$, is attached a toothed wheel, $i$, which is engaged by a click, $j$, pivoted to the plate $b$. The click $j$ is pressed on opposite sides by the arms $k$ of the looped double-acting spring F, secured to the plate $b$ at one side of the tubular stud $g$, and extending around the said stud on opposite sides thereof. The spaces between the teeth of the wheel $i$ are of sufficient depth to allow the click $j$ to pass by the said wheel in either direction.

To the ears $d$ is secured a tubular stud, $l$, to which is fitted a tubular shaft, $m$, carrying at its upper end a spur-wheel, $n$. The spur-wheel $n$ engages an intermediate spur-wheel, $o$, turning on a screw, $p$, inserted in the plate $a$. The intermediate wheel, $o$, engages a pinion, $q$, secured to that face of the reel A adjoining the plate $a$.

To the inner face of the plate $a$ is secured one end of a flat curved spring, $r$, the free end of which is adapted to bear upon the side of the reel A. In a threaded aperture of the plate $a$ is inserted a screw, $s$, which bears upon the outer face of the spring $r$ and serves to regulate the pressure of the said spring against the side of the reel. The regulating-screw $s$ is placed at or near the mid-length of the spring $r$, so as to allow the screw to press a portion of the spring with which it contacts with sufficient force against the side of the reel to prevent the reel from turning.

The tubular shaft $m$ and the tubular shaft $h$ of the reel E are internally threaded, and are both adapted to receive the hand-crank G, which may be changed from one to the other, as circumstances may require. When the crank G is inserted in the shaft m, the motion of the crank is multiplied so as to revolve the reel A rapidly; but when the crank is inserted in the tubular shaft of the reel the reel turns with the crank. The screw t is provided for stopping the ends of the hollow shafts m h when not occupied by the crank. The interiors of the hollow shafts m h are employed as oil-reservoirs for retaining oil for lubricating the reel and the gearing-shaft.

In holes formed in the hollow semi-cylindrical projections c are inserted the ends of a spindle, u, which is convex in the direction of its length, the said spindle being arranged parallel with the axis of the reel and serving to distribute the line as it is wound upon the reel, so that it is wound evenly.

The handle H, which is provided at one end with a ferrule (not shown) for receiving the fishing-rod, has upon the other end the socket B, which is adapted to screw upon the semi-cylindrical projections e. In the handle H is formed a passage, v, extending from one side of the handle diametrically to the center of the end of the handle within the socket B, and from the passage v a groove, w, extends toward the opposite end of the handle. In the handle H, near the rod-receiving end thereof, is inserted a rod, a', having on its outer end a button, b', and surrounded within the bore of the handle with a spiral spring, c', normally holding the button b' above the bottom of the groove w. The rod a' is apertured transversely underneath the head and in the direction of the groove w, to receive the line d', extending from the reel outward through the passage v and groove w.

To the socket B is fitted an externally-threaded thimble, e', through which the line d' passes, and the purpose of which will presently be described. To the semi-cylindrical projections c is fitted a ferrule, f, in which is inserted the handle end D. In the handle end D is formed a longitudinal groove, f', for receiving the frame of an ordinary reel, I, as shown in Fig. 3, the reel being held in its place by the insertion of one end of the frame underneath the ferrule f and the engagement of the other end of the frame by the screw-cap g'. The cap g' is provided with a central screw, h', which is received in a nut, i', inserted in the bore of the handle end. When the ordinary reel, I, is to be used, it is secured to the handle end D in the manner described, and the reel A is removed from the said handle end and from the handle H. The thimble e' is unscrewed, so as to cause it to project from the socket B, and the said thimble is screwed into the ferrule f, completing the working connection of the handle end D with the handle H.

When it is desired to allow the line to leave the reel freely, the adjusting-screw s is unscrewed. When it is desired to apply more or less friction and to retard the line, the amount of friction is regulated by means of the screw s, as before described. Should friction upon the line be required while reeling it, it may be applied by pressing the button b' down upon the line. When it is desired to rotate the reel quickly, the crank G is inserted in the tubular shaft m of the spur-wheel n, and when it is desired to reel the line slowly or with considerable force the screw t is removed from the pivotal shaft of the reel E and the crank G is inserted in its place, while the screw t is inserted in the tubular shaft m of the spur-wheel n.

Having thus fully described my invention, I claim as new and desire to secure by Letters Patent—

1. The combination, with the reel A, of the spindle u, arranged in the tubular projection of the reel-case parallel with the axis of the reel and made convex at its middle in the direction of its length, substantially as described.

2. The combination, with the reel A, provided with the tubular internally-threaded shaft h and pinion q, of the cover-plates a b, the latter provided with the tubular studs g l and the former with the internally-threaded tubular shaft m, inserted in the tubular stud l, the spur-wheel n, attached to the tubular shaft m, the intermediate wheel, o, adapted to engage the spur-wheel n and pinion q, whose shaft receives the shaft g, and the crank G, provided with a screw-threaded shank adapted to fit into either of the tubular shafts m h, substantially as described.

3. The combination, with the reel A and its frame, formed of the plates a b and provided with the threaded projections c e, applied at the ends of the plates and forming tubular extensions thereof, of the handle H, provided with the groove w and passage v, the socket B, secured to the handle and adapted to receive the threaded projection c, and the handle end D, provided with the ferrule f, adapted to receive the threaded projection e, and having the longitudinal groove f', serving as a reel-seat, and screw-cap g', substantially as described.

4. The combination, with the handle H, provided with the groove w, of the spring-pressed transversely-apertured rod a', receiving a retaining-stop, provided with the button b', arranged in said groove, and beneath which passes the line, substantially as described.

5. The combination, with the handle H, provided with the socket B, of a handle end, D, provided with a longitudinal groove, f', ferrule f, and the thimble e', adapted to connect the socket B and ferrule f, substantially as described.

ABRAHAM COATES.

Witnesses:
W. W. RICE,
F. R. HUNTINGTON.